United States Patent
Hinkle et al.

(10) Patent No.: US 6,411,375 B1
(45) Date of Patent: Jun. 25, 2002

(54) SHAFT ALIGNMENT METHODOLOGIES

(75) Inventors: David A. Hinkle; David A. Kowal; Henry M. Dent; Charles A. Manneschmidt, all of Knoxville, TN (US)

(73) Assignee: CSI Technology, Inc., Wilmington, DE (US)

(*) Notice: Subject to any disclaimer, the term of this patent is extended or adjusted under 35 U.S.C. 154(b) by 0 days.

(21) Appl. No.: 09/685,318

(22) Filed: Oct. 10, 2000

(51) Int. Cl.[7] .................. G01B 11/26; G01B 13/18; G01B 5/24; G01C 1/00; G01C 15/00; G01D 21/00

(52) U.S. Cl. .................. 356/152.1; 356/153; 33/286; 33/412; 33/645

(58) Field of Search .................. 356/152.1, 153, 356/139.1, 141.3, 139.04, 139.09; 33/645, 412, 286

(56) References Cited

U.S. PATENT DOCUMENTS

| | | | | | |
|---|---|---|---|---|---|
| 4,115,925 A | * | 9/1978 | Malak | .................. | 33/181 |
| 4,148,013 A | * | 4/1979 | Finn et al. | .................. | 340/189 |
| 4,553,335 A | * | 11/1985 | Woyton | .................. | 33/181 |
| 4,586,264 A | * | 5/1986 | Zatezalo | .................. | 33/412 |
| 4,709,485 A | * | 12/1987 | Bowman | .................. | 33/228 |
| 5,026,998 A | * | 6/1991 | Holzl | .................. | 250/561 |

(List continued on next page.)

FOREIGN PATENT DOCUMENTS

| | | |
|---|---|---|
| DE | 195546405 | 6/1997 |
| EP | 0 962 746 | 12/1999 |

OTHER PUBLICATIONS www.pruftechnik.com, TechNote #17 Rotalign, The 'Sweep' measurement mode capitalizes on the patented 'Multi–point' functionality for greater accuracy and flexibility.

(List continued on next page.)

Primary Examiner—Thomas H. Tarcza
Assistant Examiner—Brian Andrea
(74) Attorney, Agent, or Firm—Luedeka, Neely & Graham, P.C.

(57) ABSTRACT

A method for acquiring misalignment information as to centerlines of first and second in-line shafts utilizing a shaft alignment system including an analyzer having a memory. A sensor head mounted on the first shaft at an initial angular position relative to the centerline of the first shaft includes a microprocessor having memory, a collimated light source emitter for transmitting a collimated light beam in a first direction corresponding to the centerline of the first shaft, a detector having a detecting surface for detecting a collimated light source from a second direction corresponding to the centerline of the second shaft, and an angular position sensor for determining an angular position of the sensor head as the head is rotated about the centerline of the first shaft. The sensor head is rotated in a first or a second rotational direction relative to the centerline of the first shaft. As the sensor head is rotated, an impinging collimated light beam is detected from the second direction on the detecting surface of the detector. Positional information is acquired as between the centerlines of the first and second shafts as the collimated beam impinges on the detecting surface of the detector. The method of data acquisition includes defining either the first or the second rotational direction as the acquisition direction and committing positional information to the memory of the microprocessor only if the positional information was acquired when the head was rotating in the acquisition direction.

20 Claims, 7 Drawing Sheets

U.S. PATENT DOCUMENTS

| | | | |
|---|---|---|---|
| 5,056,237 A | * | 10/1991 | Saunders .................... 33/645 |
| 5,077,905 A | * | 1/1992 | Murray, Jr. ................ 33/412 |
| 5,263,261 A | | 11/1993 | Piety et al. |
| 5,430,539 A | | 7/1995 | Lysen |
| 5,621,655 A | | 4/1997 | Nower et al. |
| 5,684,578 A | | 11/1997 | Nower et al. |
| 5,715,609 A | * | 2/1998 | Nower ....................... 33/645 |
| 6,040,903 A | | 3/2000 | Lysen et al. |
| 6,046,799 A | | 4/2000 | Lysen |
| 6,049,378 A | | 4/2000 | Busch et al. |

OTHER PUBLICATIONS www.pruftechnik.com, TechNote #24 Rotaligh, Selecting the proper Rotalign measurement mode.

www.pruftechnik.com, TechNote #31 Optalign Plus, Selecting the proper Optalign Plus measurement mode.

www.pruftechnik.com, TechNote #33 Rotalign/Optalign Plus, Uncoupled shaft alignment with Multipoint measurement mode.

* cited by examiner

SHAFT ALIGNMENT METHODOLOGIES

TECHNICAL FIELD

This invention relates generally to shaft alignment systems. More particularly, this invention relates to methods for aligning coupled or uncoupled shafts utilizing a shaft alignment system.

BACKGROUND OF THE INVENTION

As is well known, whenever two rotating machine shafts are coupled together, such as the shaft of an electric motor and the shaft of a pump, it is important that the shafts be aligned within tolerances. Such shafts, when in perfect alignment, have their extended center lines (axes of rotation) coinciding along a straight line. Misalignment can lead to vibration, excessive wear, and ultimate destruction of couplings, bearings, seals, gears and other components.

A number of shaft alignment methods is known, which generally have in common the use of suitable alignment fixtures, also termed alignment brackets. The alignment brackets are employed to measure particular relative displacements (also termed angularities and offsets) as the shafts or alignment brackets are rotated together through one revolution, taking readings at various angular positions.

It is not uncommon for the couplings, which are used to couple the two shafts to one another, to exhibit looseness or torsional play, also termed backlash. Typically the mechanical response exhibited by the mechanical coupling differs depending on which direction the coupled shafts are rotated. Current shaft alignment methodologies do not take into account the backlash effect or do so marginally.

Because of disadvantages existing with respect to prior art shaft alignment methodologies, there exists a need in the art for improved shaft alignment methodologies which include consideration of backlash effects, resulting in greater accuracy when collecting alignment data for determining shaft misalignment.

SUMMARY OF THE INVENTION

The needs expressed above, and other needs, are met by a method for acquiring data as to centerlines of first and second in-line shafts utilizing a shaft alignment system including an analyzer having a memory. The shaft alignment system includes at least one sensor head mounted on the first shaft at an initial angular position relative to the centerline of the first shaft. The sensor head includes a microprocessor having memory, a collimated light source emitter for transmitting a collimated light beam in a first direction corresponding to the centerline of the first shaft, a detector having a detecting surface for detecting a collimated light source from a second direction corresponding to a position of the centerline of the second shaft, and an angular position sensor for determining an angular position of the sensor head as the head is rotated about the centerline of the first shaft. The method first initializes the sensor head to begin acquiring data. The sensor head is then rotated in a first or a second rotational direction relative to the centerline of the first shaft while detecting an impinging collimated light beam from the second direction on the detecting surface of the detector. Based on the detecting step, positional information is acquired corresponding to the positions of the centerlines of the first and second shafts as the collimated beam impinges on the detecting surface of the detector. Angular positions of the sensor head are determined relative to the centerline of the first shaft and either the first or the second rotational direction is defined as the acquisition direction. Positional information is committed to the memory of the microprocessor only if the positional information was acquired when the head was rotating in the acquisition direction.

In an alternative embodiment, the invention utilizes a method for acquiring data as to centerlines of first and second in-line shafts. A first sensor head is mounted on the first shaft including a collimated light source emitter for transmitting a collimated light beam in a first direction corresponding to the centerline of the first shaft, a detector having a detecting surface including a first detection region and a second detection region for detecting a collimated light source from a second direction corresponding to a position of the centerline of the second shaft, and an angular position sensor for determining an angular position of the sensor head as the head is rotated about the centerline of the first shaft. A second sensor head is mounted on the second shaft including a collimated light source emitter for transmitting a collimated light beam in the second direction corresponding to the centerline of the second shaft, a detector having a detecting surface including a first detection region and a second detection region for detecting a collimated light source from the first direction corresponding to a position of the centerline of the first shaft, and an angular position sensor for determining an angular position of the sensor head as the head is rotated about the centerline of the second shaft. The first sensor head is adjusted relative to the centerline of the first shaft such that the collimated light source from the second direction impinges upon the detecting surface of the first sensor head detector. Likewise, the second sensor head is adjusted relative to the centerline of the first shaft such that the collimated light source from the first direction impinges upon the detecting surface of the second sensor head detector. The first or the second sensor head is then rotated in a first or a second rotational direction relative to the centerline of either the first or the second shaft. An impinging collimated light beam is detected from the second direction on the detecting surface of the detector of the first sensor head. Similarly, an impinging collimated light beam is detected from the first direction on the detecting surface of the detector of the second sensor head. Based on the detecting steps, positional information is acquired corresponding to the positions of the centerlines of the first and second shafts as either the first or the second collimated beam impinges on the detecting surfaces of the detectors of the first or second heads. Angular positions of the first and second sensor heads are determined relative to the centerlines of the first and second shafts, respectively. Positional information is acquired as the first and second collimated beams of light impinge on the detecting surfaces of the detectors of the sensor heads. The positional information is committed to the respective sensor head memory only if the positional information was acquired when the respective collimated light beam impinged on the respective first detection region of the detecting surface of the detector of the first or second sensor head.

BRIEF DESCRIPTION OF THE DRAWINGS

Further advantages of the invention will become apparent by reference to the detailed description of preferred embodiments when considered in conjunction with the drawings, which are not to scale, wherein like reference characters designate like or similar elements throughout the several drawings as follows.

DETAILED DESCRIPTION OF THE INVENTION

Figure 1:
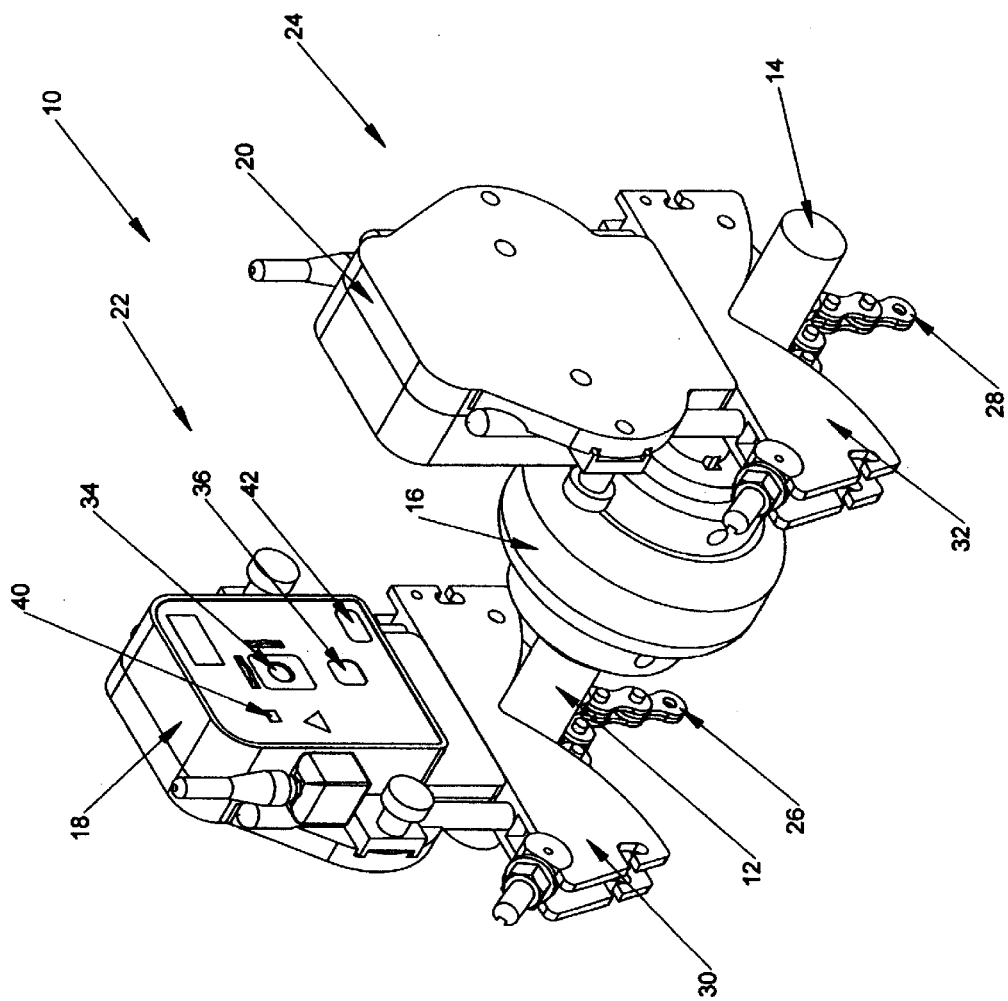
FIG. 1 is a perspective view of a shaft alignment system.

Referring now to the Figures in which like reference numerals indicate like or corresponding features, there is shown in FIG. 1 a laser shaft alignment system 10 for aligning a first shaft 12 with a second shaft 14, also termed shaft centerline alignment. A complete description of laser alignment systems and associated mounting systems is disclosed in: U.S. Pat. No. 5,371,953, titled, A Shaft Alignment Apparatus, issued Dec. 13, 1994, by Daniel L. Nower et al.; U.S. Pat. No. 5,684,578, titled, Laser Alignment Head For Use In Shaft Alignment, issued Nov. 4, 1997, by Daniel L. Nower et al.; and, U.S. Pat. No. 5,715,609 titled, Stationary Shaft Alignment Apparatus, issued Feb. 10, 1998, by Daniel L. Nower, all of which are hereby incorporated by reference. The above incorporated references fully describe the type of mounting systems and how measurements are taken when utilizing the systems. As was described in the above referenced patents, the basic information to be gathered in the shaft alignment system 10 is the amount of offset and angularity between a projection coaxial to one shaft 12 and the other shaft 14.

The shaft alignment system 10 is used to determine an amount and direction of misalignment between the first and second in-line shafts 12 and 14 (normally termed shaft centerline misalignment). The shafts 12 and 14 are shown coupled to each other by means of a coupling 16. However, the shaft alignment system 10 works equally well when the shafts 12 and 14 are not coupled to one another. As shown in FIG. 1, the shafts 12 and 14 are connected to respective machines, such as a motor driving a pump through the shafts 12 and 14, and coupling 16. A first sensor head 18 and a second sensor head 20 are mounted and positioned with respect to each other on the shafts 12 and 14 using the mounting assemblies as described in the references cited above. As discussed further below, sensor heads 18 and 20 are used to determine the degree of misalignment of the shafts 12 and 14, with or without having to rotate the shafts 12 and 14. After information relevant to the misalignment is measured, at least one of the machines is moved, as by loosening its mounting bolts, moving the machine in a horizontal plane, and/or inserting or removing shims under one or more machine feet to set the machine in the vertical plane, all as necessary, to bring the shafts 12 and 14 into an acceptable alignment condition.

The sensor heads 18 and 20 are utilized with the mounting systems 22 and 24 which are described in detail in the above incorporated patents. Mounting systems 22 and 24 include chain assemblies 26 and 28, mounting bases 30 and 32, and mounting posts 50 and 52. The chain assemblies 26 and 28 provide a means to secure the bases 30 and 32 to the shafts 12 and 14, respectively.

In a preferred embodiment of the invention, the laser shaft alignment system 10 includes a first sensor head 18 and a second sensor head 20. For ease of explanation and not to produce undue duplication, the foregoing description primarily describes one sensor head in detail, which fully describes the second sensor head. With additional reference now to FIGS. 2 and 3, head 18 includes a laser aperture 34 through which a low power laser beam is emitted. However, head 18 is not limited to a low power laser and accordingly may include any collimated light source having varying power emitting capacities. In a preferred embodiment, head 18 includes a laser having a range of between about 30 feet to about 100 feet. Further, head 18 includes a sensor window 36 through which the laser beam emitted by the opposing head 20 is received. In an alternative embodiment of the invention, the sensor window 36 is operable to receive a reflected beam of light from an opposing sensor head incorporating a reflective element, such as a convex mirror or prism, wherein the head 18 provides the incident beam of collimated light. The sensor window 36 provides a window by which the laser beam may strike a photosensitive position detector 38 which is described more fully below. Preferably the sensor window 36 has dimensions of between about 10 mm by about 10 mm. Alternatively, the sensor window 36 may have dimensions of between about 20 mm by about 20 mm, or larger. A light emitting diode (LED) 40 indicates the sensor head 18 functionality and laser activity status and a power switch 42 enables the head 18 when actuated.

Provided on the head 18 is a vertical aiming adjustor 44, allowing small vertical adjustments of the aim of the laser through the laser aperture 34. Further, head 18 includes a horizontal aiming adjustor 46, and similarly to the vertical aiming adjustor 44, allows for small horizontal adjustments of the aim of the laser beam. In a preferred embodiment of the invention, the adjustors 44 and 46 allow the laser beams emanating from the heads 18 and 20 to be aimed so as to fall on the sensor window 36 on each head 18 and 20. Moreover, when using a sensor head 18 on one shaft and a sensor head only including a reflective element as described above on the opposing shaft, the adjustors 44 and 46 allow the laser beam emitted from the laser aperture 34 emanating from the head 18 to be aimed so as to strike the reflective element on the opposing sensor head so that the reflected collimated beam impinges on the sensor window 36 of the head 18. Preferably, when using a reflective sensor head, it is important that the detector 38 accurately detect measurements in both the x and the y directions about the detecting surface, further utilizing all of the recorded data to calculate misalignment between the two shaft centerlines. It is preferred that when adjusting the laser beam as described above, that the reflected beam is adjusted to fall on the center of the detecting surface 39. One or both heads are rotated and measurements are taken in the X and Y directions relative to the absolute center of the detecting surface 39. As described further below, the head 18 preferably includes a transceiving radio frequency (RF) antenna 48 for communicating information between the head 18 and the analyzer 76.

Figure 2:
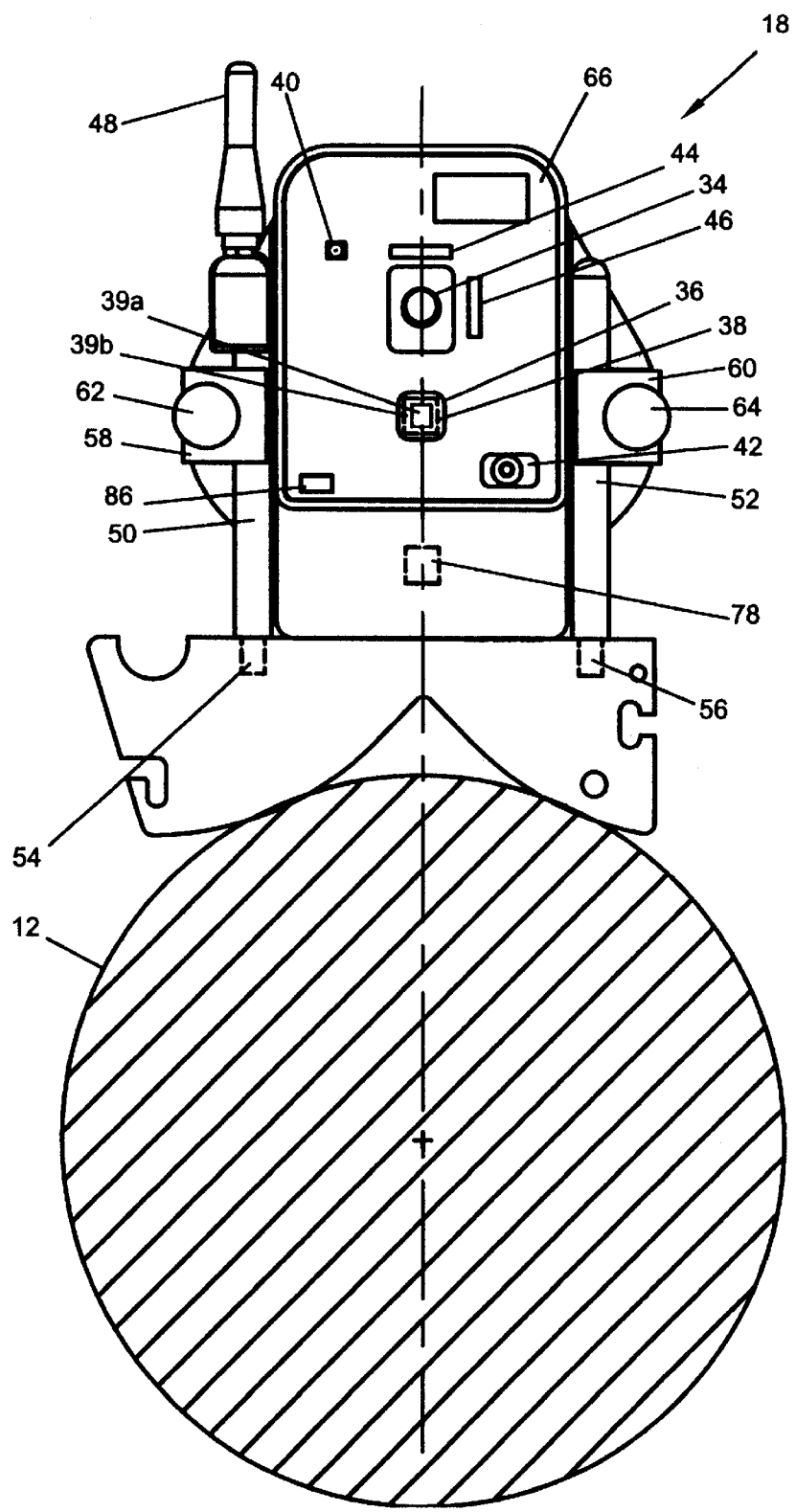
FIG. 2 is a front elevational view of a laser sensor head, according to the invention.

As best shown in FIG. 2, the posts 50 and 52 which preferably include threaded ends 54 and 56 and are attached to the mounting bases 30 and 32 for attachment of the head 18. The head 18 includes split clamps 58 and 60 which fit over the posts 50 and 52. Clamp screws 62 and 64 are provided on the split clamps 58 and 60 to allow the clamps to be tightened on the posts 50 and 52. As described fully in the above incorporated patents, the height of the heads 18 and 20 may be adjusted using the mounting system 22 and 24 so that the respective collimated light sources are positioned to impinge the respective photosensitive detectors.

Typically, the heads 18 and 20 are positioned at generally the same height above the shafts 12 and 14 by sliding the heads 18 and 20 along the posts 50 and 52 to a desired position and then tightening the split clamp screws 62 and 64. The aiming of the laser beams is then fine tuned using the vertical and horizontal aiming adjustors 44 and 46. Preferably, the perimeter of the sensor window 36 is visible or marked on the sensor heads 18 and 20 so that one may aim the beams merely by observing laser radiation on the head housing 66.

Figure 3:
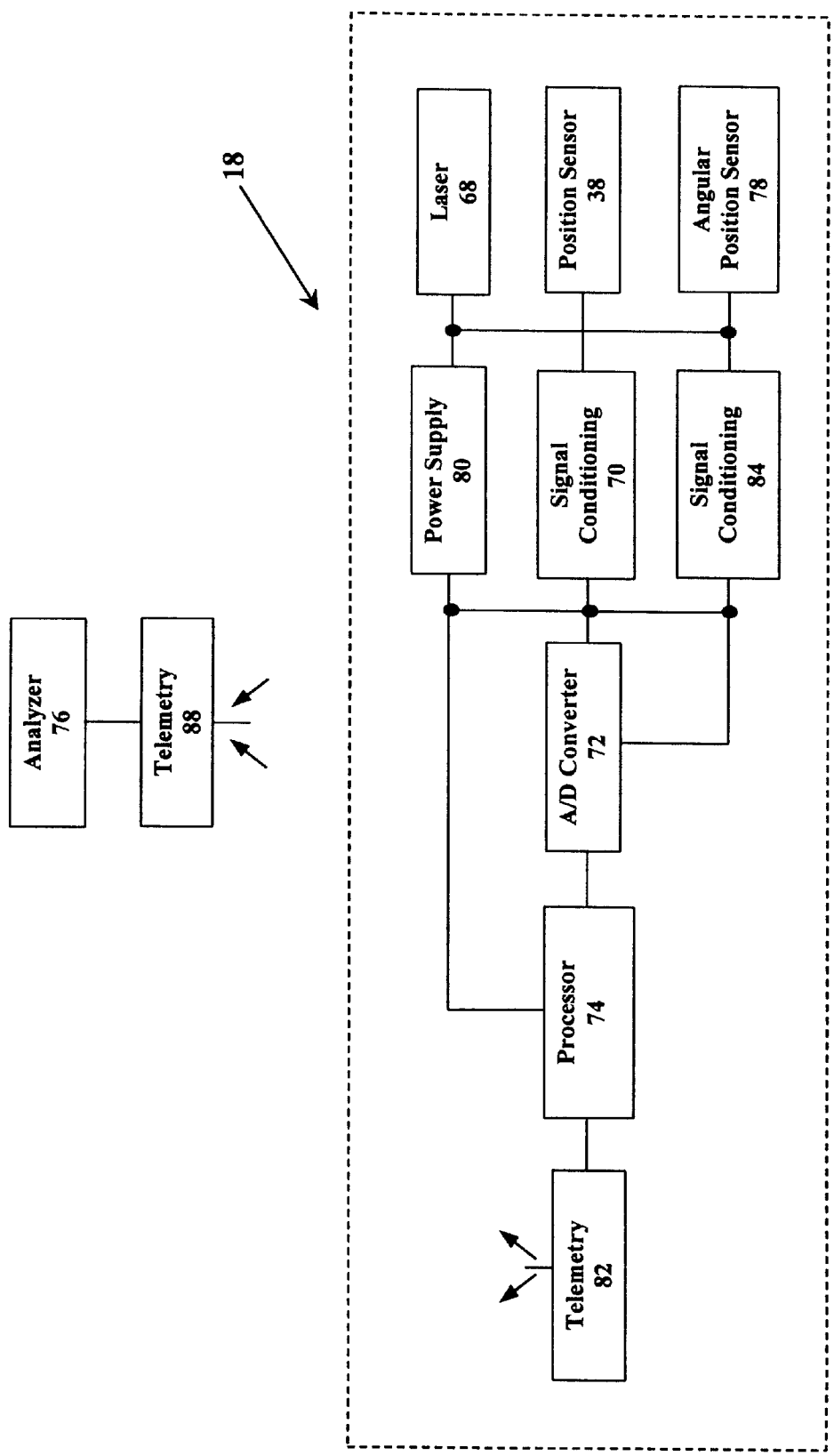
FIG. 3 is a block diagram depicting the electronics of the laser sensor head.

Referring again to the block diagram of FIG. 3, a depiction of various electronic components of the shaft alignment system 10 is shown. In particular head 18 contains a laser 68 which generates a laser beam emanating through the laser aperture 34. The position sensor 38 (photosensitive detector) senses the X and Y coordinates of a beam of light striking the position sensor 38 and generates currents whose ratio corresponds to the coordinates. These coordinates represent the position of the beam of light striking the sensor 38 with respect to the centerline of the shaft 12. The signal conditioner 70 converts the current to voltage and tracks and holds the voltages so that they can be provided to other components of the shaft alignment system 10. Finally, the voltage values are digitized by an analog to digital (A/D) converter 72 and the digital position values are provided to the processor 74 for processing of the signals to provide calibrated X and Y positions as output to the analyzer 76. Preferably, processor 74 is a MC68HC912 16-bit microprocessor, manufactured by Motorola. However, any general purpose microcontroller may be utilized, such as a standard digital signal processing (DSP) processor. The sensor head 18 further includes an angular position sensor 78 operable to determine an angular position of the sensor head 18 as it is rotated through a plurality of angular positions.

The power supply 80 provides power to the laser 68, analog-to-digital converter 72, processor 74, telemetry 82, signal conditioners 70 and 84, and the angular position sensor 78. The power supply 80 may either be operated in a continuous mode by having a switch 70 mounted on the exterior of the head 18 which a user turns on, or may be selectively controlled by the processor 74 only when desired. When controlled by the processor 74, the laser 68 can be turned on only when data needs to be taken, thus minimizing power usage by the system 10. Preferably, the laser 68 is pulsed at about 600 Hz, pertaining to an even multiple of either 50 Hertz or 60 Hertz. Accordingly, by averaging 30 pulses in 1/10 sec, the invention is operable to average over an integral number of American or European line cycles, which correspondingly improves the laser position stability of the photosensitive detector, therefore improving the system response to ambient light noise effects.

According to the invention, the angular position sensor 78 generates additional data. Preferably, the angular position sensor 78 sends the analog angular position data to the signal conditioner 84 for analog signal conditioning before the data is sent to the analog to digital converter 72, and then to the microprocessor 74. The angular position sensor 78 determines the angular position of the head 18 or, more particularly, the angular position of the position sensor 38. As described in the above referenced patents, the angular position of the head 18 at a plurality of angles must be known in addition to the change in position of the laser beam for each positional measurement.

The microprocessor 74 processes the radial position information and the corresponding rotational position information, typically using calibration values stored on board, providing the processed data to the telemetry unit 82. The telemetry unit 82 transmits the data to a second telemetry unit 88 which provides the data to the shaft alignment analyzer 76, such as the ULTRASPEC® 8117 series shaft alignment analyzer manufactured by CSI, Inc., of Knoxville, Tenn. The analyzer 76 receives the data and calculates the misalignment between the shafts 12 and 14 based on the collected data. Based on any determined shaft misalignment, the analyzer 76 further determines how the feet of the machines need to be adjusted in order to achieve optimal shaft alignment.

The analyzer 76 represents input ports and a computer, which is programmed to calculate misalignment based on provided input, plus a keyboard and display. In a typical conventional alignment calculator, input is provided through a keyboard. In contrast, analyzer 76 receives the same or similar input automatically through an input port. The analyzer 76 is programmed with an automatic mode to automatically acquire data as the shafts 12 and 14 are slowly rotated and is further programmed with manual mode to acquire data when the user instructs the analyzer 76 using the keyboard. The system is operable so that a user selects either the automatic or manual mode of data acquisition.

Preferably, the telemetry to and from the analyzer 76 and heads 18 and 20 is accomplished utilizing radio frequency (RF) transmissions via the transceiving RF antenna 48 (FIG. 2). A radio frequency transmission system allows the telemetry to be transmitted and received over short to long distances. Alternatively, an infrared type telemetry system may be used for telemetry transmissions over relatively short distances. Further, although the wireless communication of the disclosed telemetry units makes data gathering easier since there are no wires to get tangled when the shafts 12 and 14 or heads 18 and/or 20 are rotated, a wire or cable may be attached at port 86 on the head housing 66. The attached cable may be used in place of the telemetry units to transfer data from the head 18 to the analyzer 76.

There is a variety of methodologies for acquiring alignment data from the shaft alignment system 10. A preferred method of acquiring alignment data pertains to the above described shaft alignment system 10 and also to various alternative embodiments of the shaft alignment system. One such alternative embodiment utilizes at least one sensor head mounted on the first shaft 12, as described above, and a second sensor head including a reflective element mounted on the second shaft 14. The second reflective element may be any reflective surface, such as a convex mirror or reflective prism, operable to reflect a collimated light source back to the sensor head, thereby impinging the photosensitive detector for processing.

Figure 4:
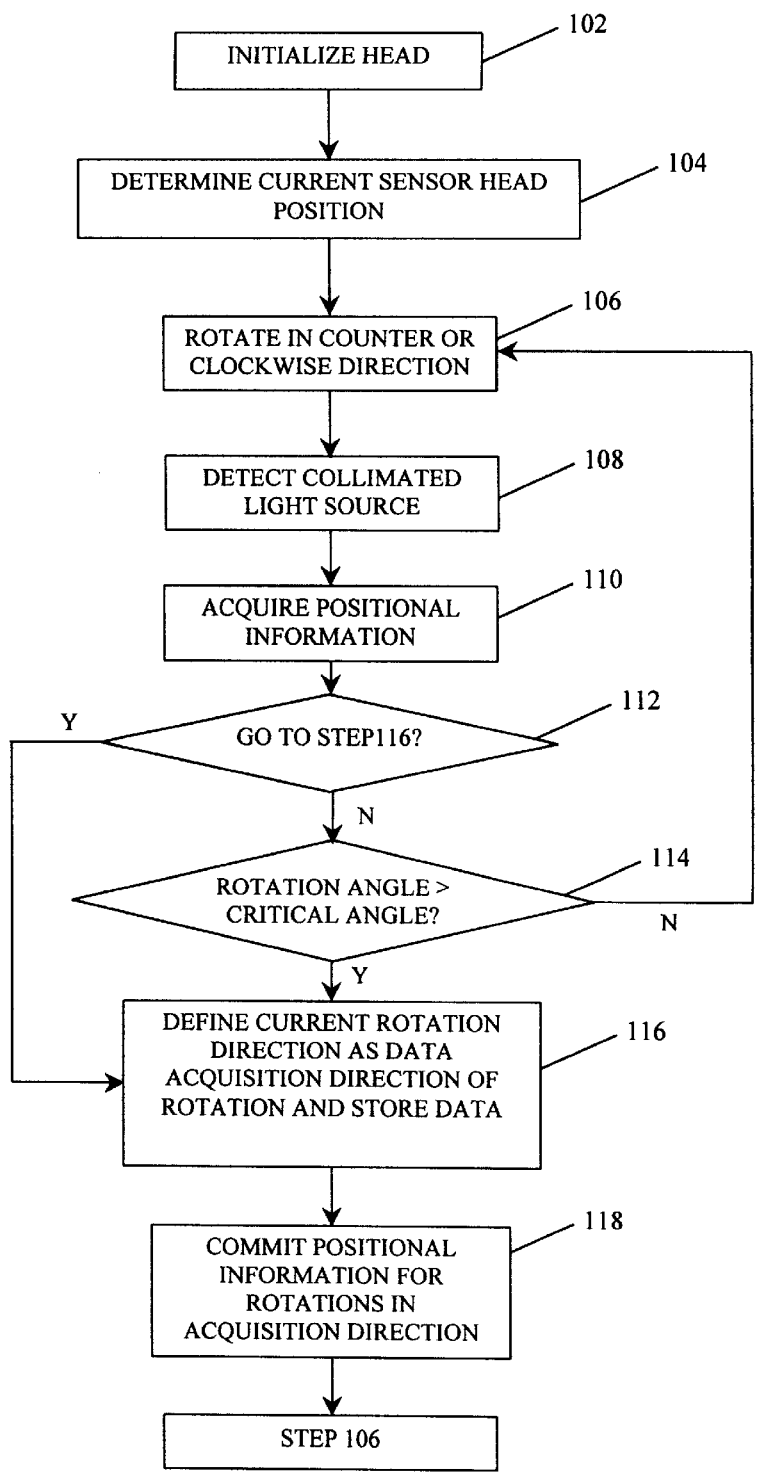
FIG. 4 is a flow diagram illustrating a method of utilizing the shaft alignment system, according to the invention.
Figure 5:
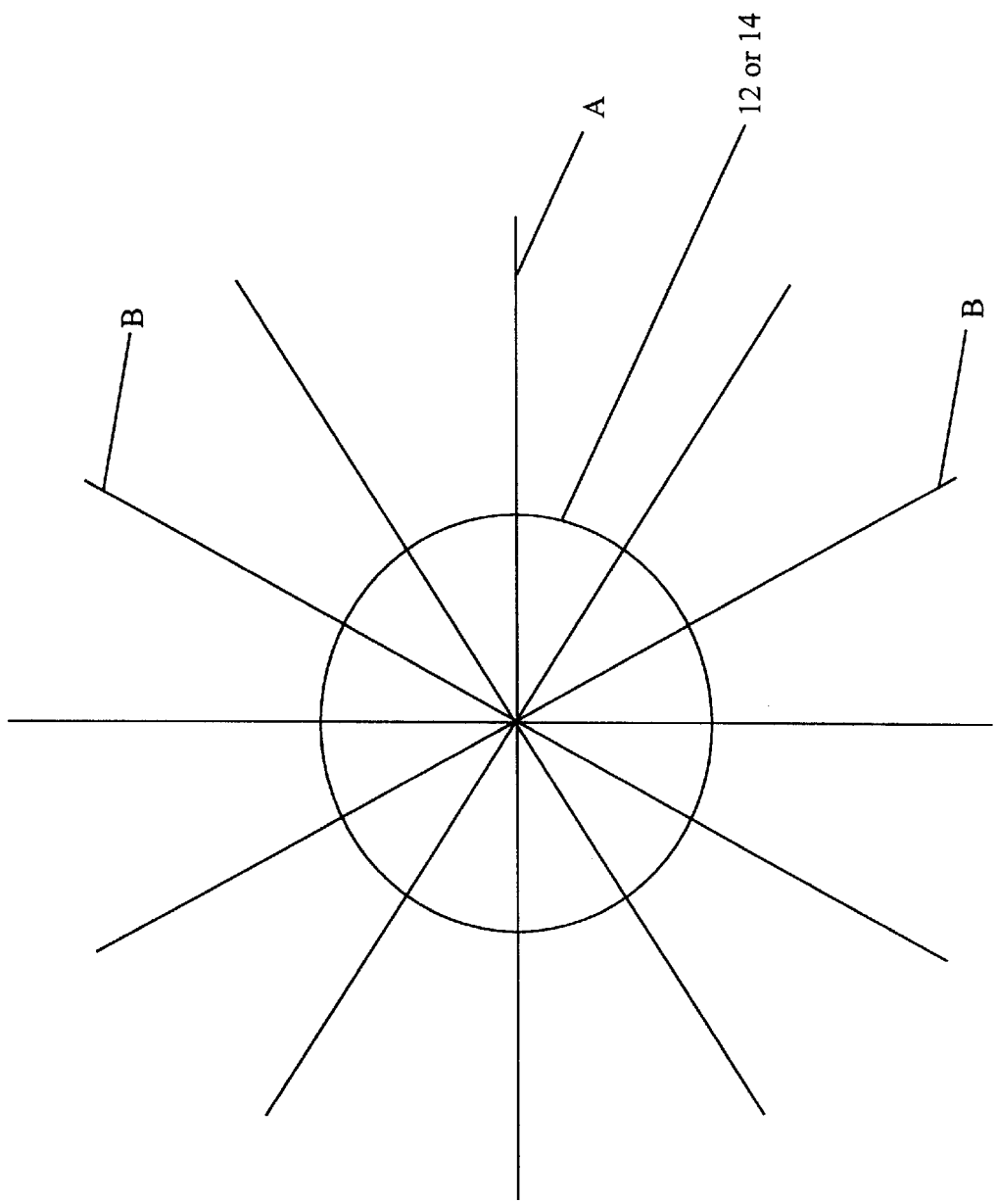
FIG. 5 is a side view of a shaft illustrating various angular positions about the shaft; and, FIGS. 6 and 7 are a flow diagram illustrating another method of utilizing the shaft alignment system, according to the invention.

Referring to FIGS. 4 and 5, a flowchart and rotational positions of a preferred method of acquiring shaft alignment data is shown. In the following description, terms such as first and second direction are often used. "First direction" refers to a direction substantially parallel to the centerline of the first shaft 12 and directed toward the second shaft 14. Likewise, "second direction" refers to a direction substantially parallel to the centerline of the second shaft 14 and directed toward the first shaft 12. Summarizing, the first method for acquiring alignment information requires that the two sensor heads mounted on shafts 12 and 14 be rotated in a complimentary manner. That is, it is preferred that the sensing heads be substantially aligned so that the detector 38 detects a signal from the second direction as the sensor heads 18 and 20 are rotated together. For each of the laser shaft alignment methodologies, the sensor heads associate position data, that is photosensitive detector vertical and horizontal readings, with specific rotational angles as the sensor heads are rotated through various rotational positions. In a preferred alignment method, the heads 18 and 20 are rotated in a clockwise or counter clockwise direction and the current rotation direction is defined as the data acquisition direction of rotation, wherein data is acquired and retained. For a most preferred alignment method, a direction of rotation is defined for data acquisition and retainment according to a first rotation of the sensor heads past a reference point (point A in FIG. 5) plus a number of rotational degrees (point B in FIG. 5), for example 20°. The number of rotational degrees is set according to the specific measuring application and user defined parameters.

Preferably, the angle resolution for the alignment methods is preferably in 1° increments. More particularly, the full 360° rotation of the sensor heads is divided into 180 angular bins, each bin corresponding to a 2° angular resolution. Each bin is preferably centered on an odd angle. For example, bin number one corresponds to the 1° orientation plus or minus 1°, bin number two corresponds to the 3° orientation plus or minus 1° and so forth. Therefore, when data is being stored or averaged in the bins, data acquired for all angles within the angular region (bin) are preferably considered together.

It should be noted that the angle resolution may be configured according to a specific application and the number of data bins may change accordingly. However, if more data is required, the system is capable of utilizing 360 data bins, corresponding to a 1-degree resolution. Similarly, if less data is required, user can select a larger angle resolution. Accordingly, a user can select how the data is grouped (i.e. 10-degrees per bin, 5-degrees per bin, 2-degrees per bin, 1-degree per bin, 0.5-degree per bin, etc.).

According to a preferred embodiment of the invention, at step 102, the memory of the microprocessor 74 in the sensor head 18 is initialized. It is preferred that the analyzer 76 transmits an initialization signal to the sensor head 18 via radio-frequency, infrared frequency or direct cable signaling, as described above. In one embodiment of the invention, during the initialization of the sensor head 18, the microprocessor 74 clears the data bins to a known value, such as 0000h or 7FFFh. At step 104, the microprocessor 74 utilizes the angular position sensor 78 input to determine the current sensor head 18 angular position, using it as a reference or start position (position A in FIG. 5) for measurement considerations, described further below. Depending on a measurement application, the sensor heads 18 and 20 are rotated either in a clockwise or counter-clockwise direction with respect to the start position (step 106). As the sensor heads 18 and 20 are rotated, the photosensitive detector 38 is collecting position data according to where the laser beam contacts the detector 38 from the first or second direction (steps 108 and 110). Preferably, the detector 38 of each sensor head 18 and 20 includes a detecting surface 39 wherein the detecting surface 39 is subdivided into a valid data portion 39a and a non-valid data portion 39b. The valid data portion 39a is defined as a subsurface of detecting surface 39 centered on a centerline 41 of the detecting surface 39.

As described above, the data acquisition direction of rotation can be determined by the first rotation of the sensor heads, i.e. rotation in a clockwise or counterclockwise direction (step 112). Alternatively, a user can define the data acquisition direction of rotation by issuing commands through the analyzer 76. Most preferably, at step 114, the microprocessor 74, again utilizing the input from the angular position sensor 78, determines whether the sensor heads have rotated past a predetermined angle, herein termed a critical angle of rotation (position B in FIG. 5). If the sensor heads have not rotated past the critical angle, then the measurement data thus far obtained is stored in temporary memory of the microprocessor 74. At this point, the sensor heads may be rotated further in the same direction or rotated from the last stopping point in the opposite direction, again dependent on the particular alignment application. If the rotation of the sensor heads is stopped short of the critical angle, and then rotated in the opposite direction the microprocessor 74 will not overwrite the data in temporary storage until the sensor heads have rotated past the starting point, at which point the microprocessor 74 writes position data to temporary memory, discarding the previous stored data, as long as the sensor heads 18 and 20 are not rotated past the critical angle. Moreover, if the sensor heads 18 and 20 are rotated in either the original rotational direction or in the opposing rotational direction and the sensor heads pass the critical angle, the microprocessor 74 then determines that the critical angle has been surpassed based on the input from the angular position sensor 78. The microprocessor 74 then defines the data acquisition direction of rotation as the direction in which the heads were rotated to surpass the critical angle (step 116). Once the critical angle is surpassed, the microprocessor 74 commits the data obtained from the starting point (point A) in the data acquisition direction of rotation to memory, meaning that the data written to the memory is useful and should be used (step 118). As used herein, the verb "commit" means to store or identify data in a manner indicating that the data is useful. Committed data can be identified by storing it in particular memory addresses or by appropriately flagging or identifying the data in general system memory.

After the critical angle has been surpassed and the sensor heads are rotated in the data acquisition direction of rotation past the starting point (point A), it is preferred that microprocessor 74 allow new data to be committed in place of the 'stale' committed data obtained in the previous rotation. In such case, the new data may physically overwrite the stale data. Alternatively, the new data may be committed in association with the appropriate bin or rotational position, and the stale data may be simply identified as stale, but not deleted or overwritten. In such case the stale data is normally ignored, but it is still available for detailed analysis, if desired.

As a further alternative, the microprocessor 74 is operable to keep a running average of the stale data and the new data obtained for each bin or rotational position, described in more detail below. If the sensor heads 18 and 20 are not rotated a full rotation, the microprocessor 74 continues writing positional and angular data to memory. Once a sufficient amount of alignment data is collected (which may be defined by the user in terms of angular rotation of the heads 18 and 20 past the starting point), the data is transmitted by the telemetry unit 82 to telemetry unit 88. The user may also manually instruct the heads 18 and 20 to transmit the data by issuing commands through the analyzer 76. The data that is sent to the analyzer 76 is analyzed to determine the shaft misalignment for purposes of aligning the centerlines of the first and second shafts 12 and 14. As a further note, it is possible to limit the data acquired to light source detections impinging on the valid data portion 39a of the detecting surface 39.

To further exemplify the above method of shaft alignment, it may be helpful to describe a specific example illustrating steps for acquiring alignment data utilizing a shaft alignment system 10, according to the invention. For purposes of example only, assume that the critical angle (point B) is a 20° rotation in either rotational direction past the starting point (point A). First, the analyzer 76 sends a command to the sensor heads 18 and 20 to perform an initialization. The initialization command may be sent via radio frequency, infrared, or direct cable link, as described above. In response, the sensor heads 18 and 20 clear all data bins to a predetermined value and define the heads' current positions to be the starting point for determination of the data collection direction. Next, for example, the sensor heads 18 and 20 are rotated less than 20° in the counter-clockwise direction from the defined starting point. Correspondingly, data is collected for this rotation, but it is not committed to memory. The counter-clockwise rotation is stopped before 20° and the heads are rotated in the clockwise direction. Data is ignored until the starting point is reached again, and once the starting point is reached, all the data collected in the counter-clockwise direction is cleared, and data acquisition is started in the clockwise direction. This mode of operation continues in both the clockwise and counter-clockwise directions until a rotation of more than 20° occurs in one of the directions of rotation. Once the 20° point is passed from the starting point in either direction, all acquired data is committed for the current direction of rotation and the direction of rotation is defined as the data acquisition direction of rotation. Now data is acquired only when the sensor heads 18 and 20 are rotated in the same direction as the defined data acquisition direction of rotation.

Defining a data acquisition direction of rotation is the same for an alignment method wherein it is preferred to average the positional data instead of overwriting any 'stale' data, as described above. For the averaging method, instead of overwriting 'stale' data, previously written data is averaged with new data for the same sensor head angular positions. Preferably, the averaging occurs as long as the sensor heads 18 and 20 are rotated at least a number of predetermined degrees, for example 20°, in the opposite direction to the data acquisition of direction of rotation, or if the sensor heads 18 and 20 are rotated a full 360° from the last angular position (after the data acquisition of direction of rotation is defined by rotating past the critical angle). For example, assume that the data acquisition direction of rotation is defined as at least a 20° rotation in either the counter or clockwise direction from the starting point (point A). When using the averaging method of shaft alignment data acquisition, the sensor heads 18 and 20 are first rotated in the clockwise direction from the starting point plus a number of rotational degrees, for example 50°. During this rotation, data has been collected and committed for each angular bin. Next, the sensor heads 18 and 20 are rotated in the counter-clockwise direction for 10° (back to an angle of 40°). Since the sensor heads' rotation is not in the data acquisition direction of rotation, all data acquired in the counter-clockwise direction is ignored. The sensor heads 18 and 20 are again rotated in the clockwise direction for 25° (to an angle of 65°). The data acquired for each bin will overwrite the previous data acquired. This occurs because the angle of negative rotation was not at least 20°, according to the averaging methodology. Continuing the example, the sensor heads 18 and 20 are rotated in the counter-clockwise direction for 30° (back to an angle of 35°). Again, because of the direction of rotation, all data is ignored. Now the sensor heads 18 and 20 are rotated in the clockwise direction for 360°. The data bins in the range 36–65° will be averaged with the previous values since there has been a rotation of at least 20° away from the last angular position. The data bins in the range 66–359° receive a data value since the direction of rotation is correct and no previous data was acquired. The data bins in the range 0–35° are averaged with the previous values since the rotation in the clockwise direction passed the starting point (i.e. 360° sweep).

Figure 6:
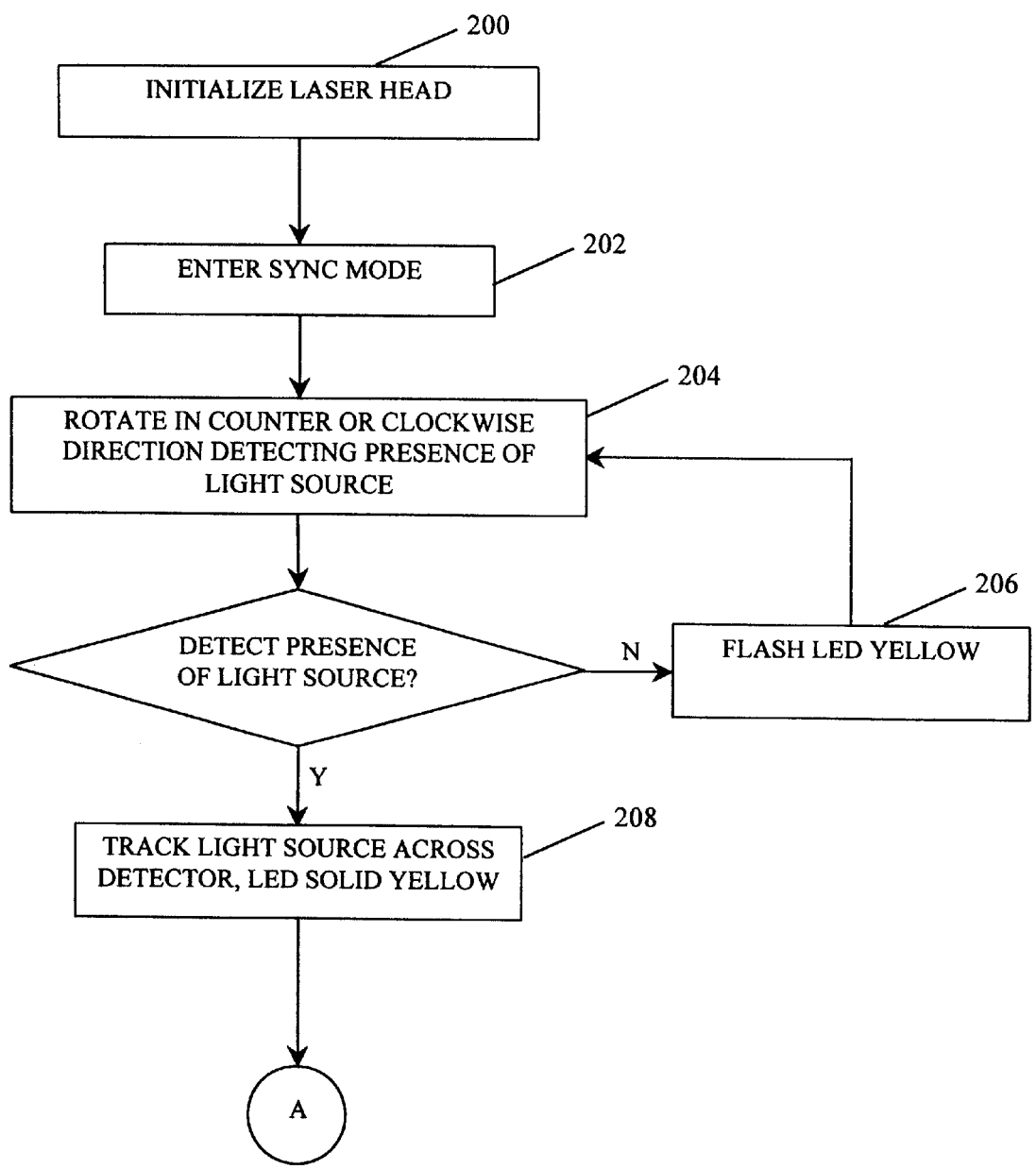
Figure 7:
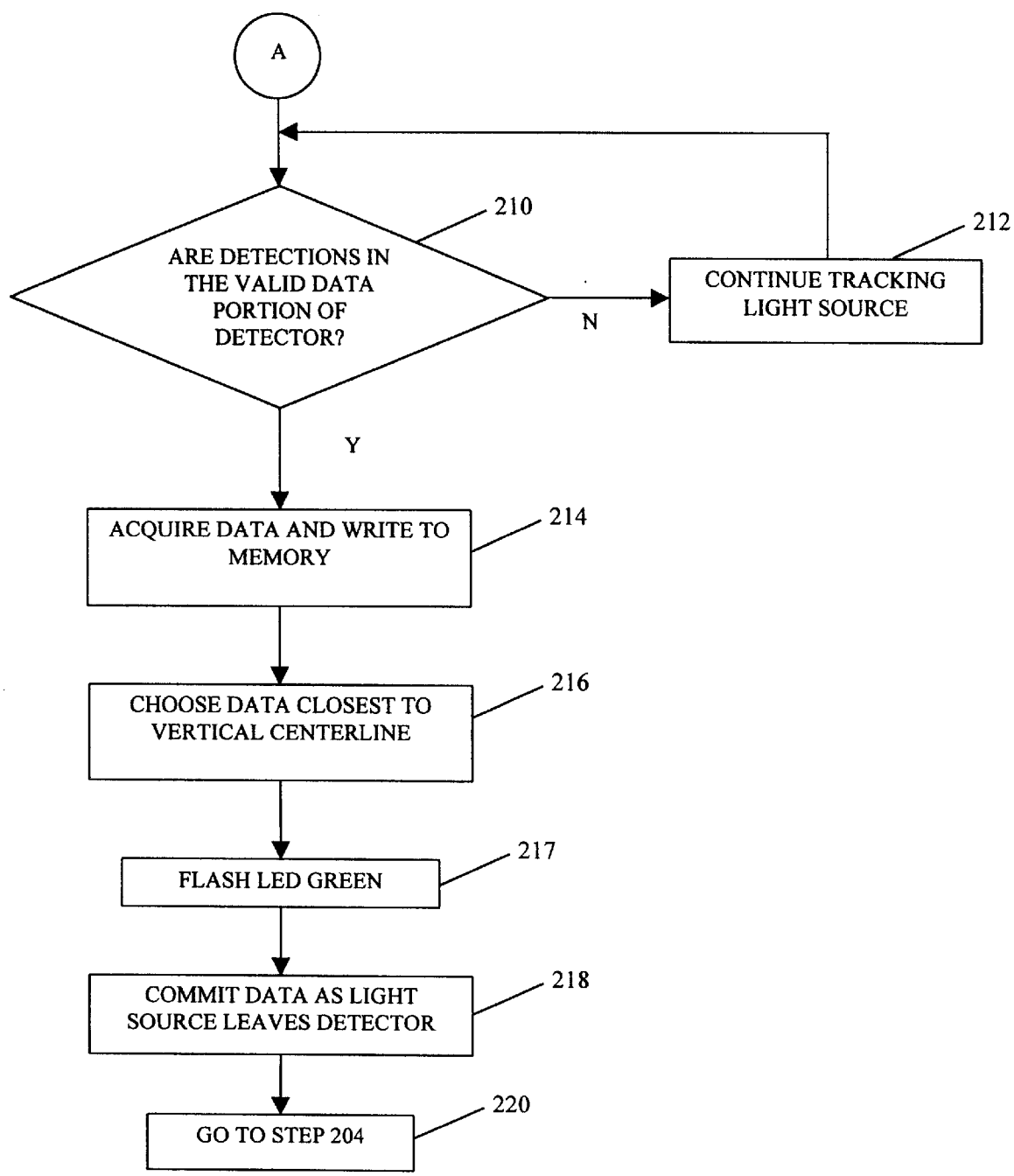

Referring now to the flowchart of FIGS. 6 and 7, an alternative method for aligning the centerlines of first and second shafts 12 and 14, utilizing a shaft alignment system 10 is described. It is preferred that the shaft alignment system 10 includes a first sensor head 18 and a second sensor head 20, including the sensor components as described above. This alternative method of shaft alignment does not require rotating the sensor heads 18 and 20 together in a coupled manner. Rather, each head 18 or 20 is preferably rotated in a clockwise or counter-clockwise direction past the other sensor head as each sensor head transmits a collimated light beam and detects the light beam emitted from the opposing sensor head.

This alternative method of shaft alignment uses sensor heads 18 and 20 each being operable to rotate independently of the opposing sensor head. At step 200, the analyzer 76 preferably sends the command to the sensor heads 18 and 20 to perform an initialization, preferably clearing the data bins to a predetermined value. In a preferred alternative embodiment each head 18 and 20 initiates a special 'sync' mode of operation (step 202). The special 'sync' mode of operation assures that the processing features of the microprocessor 74 are coordinated since the sensor heads 18 and 20 are preferably rotating independent of one another in an uncoupled manner.

According to the preferred embodiment, the laser 68 is pulsed to provide increased power output, thereby improving the signal-to-noise ratio of the signal detected by the opposing position sensor 38. In this embodiment, the two laser heads 18 and 20 must be synchronized to allow the position sensor signals to be sampled by the microprocessor 18 when the laser 68 is on and again when the laser 68 is off. The signal when the laser 68 is off is then subtracted from the signal when the laser 68 is on to correct for ambient light errors introduced into the position sensor signals. In this preferred embodiment, the synchronization is accomplished by taking the detected signal from the position sensor 38 and using it as the input to a phase-locked-loop (PLL) which then provides the timing signals for data acquisition by the microprocessor 18. However, when the sensor heads 18 and 20 are moved independently from on another, the lasers 68 from the sensor heads 18 and 20 do not always impinge on the position sensors 38 of the opposing sensor heads. In this situation, the synchronization-input signal to the phase-locked-loop must be provided by another means. In a preferred embodiment, a signal cable between the two sensor heads 18 and 20 provides the synchronization-input signal to the phase-locked-loop. This synchronization-input signal can also be provided by other methods, including RF and infrared signals. In an alternative embodiment of the invention, the synchronization-input signal is not necessary when the laser 68 is operated in a continuous-wave mode (i.e. not pulsed). In this embodiment, the position sensor signals can be sampled by the microprocessor 18 at any time since the laser 68 is on continuously. However, it is preferred that a more powerful laser be implemented to provide a comparable signal-to-noise ratio for the reasons described above for the pulsed laser.

At step 204, one or both of the sensor heads are rotated in a clockwise or counter-clockwise manner as each sensor head begins detecting the presence of the other sensor head's light source on its detector 38. As described above, the detector 38 of each sensor head 18 or 20 preferably includes a detecting surface 39 wherein the detecting surface 39 is subdivided into a valid data portion 39a and a non-valid data portion 39b. The valid data portion 39a is defined as a subsurface of detecting surface 39 centered on a centerline 41 of the detecting surface 39. In certain measurement configurations, it is desirable to restrict the valid detection region of the position sensor. For example, if the user desires to acquire measurement data which are closely restricted to the vertical centerline of the detecting surface 39, the valid detection window can be defined as ±25% of the detecting surface width around the centerline. This would be desirable since the truest data as to the alignment condition is when the radial data point is taken at the same horizontal position sensor reading. The valid detection window can be set to a detection region of about 10% to about 100% of the detecting surface width, centered around the vertical centerline of the detecting surface 39.

If the light source is not detected on the detector surface 39, the LED 40 of the sensor head 18 or 20 continually flashes yellow (step 206). At step 208, upon detecting the light source, the sensor head 18 or 20 tracks the light source across the detector surface 39. As soon as the laser beam is detected on the detecting surface 39 of the detector 38, the sensor head 18 or 20 changes the LED 40 to a solid yellow. At steps 210 and 214, if the light source impinges on the valid data portion 39a centered on the detecting surface centerline 41, the data is acquired and stored in the memory of the microprocessor 76. Otherwise, the light source continues to be tracked across the detector (step 212). As valid data is acquired, the sensor heads 18 or 20 will flash the LED 40 green once. Data is continually acquired while the light source impinges upon the valid data portion 39a of the detector surface 39. According to the invention, it is preferred that microprocessor 76 retain the position data corresponding to the closest distance relative to the vertical centerline 41 (i.e. horizontal position closest to zero) along with the corresponding angular position (step 216). As each sample is taken, the LED 40 flashes green to indicate that a valid data point has been acquired (step 217). If the heads 18 or 20 are rotated too quickly such that the light source passes across the detecting surface 39 of the detector 38 so quickly that a data point is not acquired within the valid data portion 39a, no data will be acquired and accordingly, an error signal is produced by the microprocessor 76, indicating that the sensor head rotation is too fast. At step 218, as the light source leaves the detecting surface 39 of the detector 38 completely, any acquired data points are committed to the appropriate angular bin. At step 220, each sensor head 18 or 20 begins detecting the presence of the light source on the detecting surface 39 of the detector 38, with the LED 40 again flashing yellow. It should be noted that it is possible to acquire multiple position data points due to the higher sampling rate of the detector 38 as compared to the resolution of the angular position sensor 78.

The methodology for acquiring data using the uncoupled heads 18 and 20 is the same as described above with respect to coupled heads. In both cases data is collected but not committed until the heads are rotated a predetermined distance past a starting point. When the predetermined distance is surpassed, a data acquisition direction of rotation is defined and data is collected only when the heads are being rotated in the data acquisition direction. Likewise, the data is either replaced or averaged based on the same criteria as described above with respect to the coupled heads 18 and 20.

It is contemplated, and will be apparent to those skilled in the art from the preceding description and the accompanying drawings, that modifications and changes may be made in the embodiments of the invention. While the present invention has been disclosed in connection with dual laser heads, a single laser head and a single reflective head, and coupled and uncoupled modes of operation, it will be appreciated that these methods are applicable to other shaft alignment measurement techniques as well. Accordingly, it is expressly intended that the foregoing description and the accompanying drawings are illustrative of preferred embodiments only, not limiting thereto, and that the true spirit and scope of the present invention be determined by reference to the appended claims.

What is claimed is:

1. A method for acquiring data as to centerlines of first and second in-line shafts utilizing a shaft alignment system including an analyzer having a memory, at least one sensor head mounted on the first shaft at an initial angular position relative to the centerline of the first shaft including a microprocessor having memory and facing in a first direction corresponding to a position of the centerline of the first shaft, a detector having a detecting surface for detecting a collimated light source from a second direction corresponding to a position of the centerline of the second shaft, and an angular position sensor for determining an angular position of the sensor head as the head is rotated about the centerline of the first shaft, the method comprising the steps of:

(a) initializing the sensor head to begin acquiring data, (b) rotating the sensor head in a first or a second rotational direction relative to the centerline of the first shaft, (c) detecting an impinging collimated light beam from the second direction on the detecting surface of the detector, (d) based on the detecting step, acquiring positional information corresponding to the positions of the centerlines of the first and second shafts as the collimated beam impinges on the detecting surface of the detector and as the sensor head is rotated, (e) determining angular positions of the sensor head relative to the centerline of the first shaft, (f) defining either the first or the second rotational direction as an acquisition direction, and (g) committing positional information to the memory of the microprocessor only if the positional information was acquired when the head was rotating in the acquisition direction.

2. The method of claim 1 wherein the step of defining either the first or the second rotational direction as the acquisition direction further comprises the steps of:

comparing the angular position of the sensor head to a predetermined angular value corresponding to a rotational amount in the first or second direction relative to the initial head angular position, determining whether the angular position of the sensor head has exceeded the predetermined angular value, and defining the acquisition direction when the predetermined angular value is exceeded in the first or second rotational direction.

3. The method of claim 1 wherein the step of initializing the sensor head further comprises sending an initialization command from the analyzer by radio frequency transmission, infrared transmission, or cable link.

4. The method of claim 1 wherein the step of committing positional information in the memory of the microprocessor only for sensor head rotations in the acquisition direction further comprises the steps of:

defining predetermined rotational ranges of the head as bins, averaging the committed positional information for each bin to determine an averaged positional information for each bin, and committing the averaged positional information in the memory of the microprocessor in association with a corresponding bin.

5. The method of claim 1 wherein the step of committing positional information in the memory of the microprocessor only for sensor head rotations in the acquisition direction further comprises:

defining predetermined rotational ranges of the head as bins, and committing new positional information in association with a particular bin for which data has been collected twice by twice rotating the sensor head in the acquisition direction through the rotational range associated with the particular bin.

6. The method of claim 1 further comprising committing positional information in the memory of the microprocessor only for sensor head rotations in the acquisition direction, defining predetermined rotational ranges of the sensor head as bins, and committing new positional information in association with a particular bin if:

(1) the sensor head has been rotated in a direction opposite the acquisition direction for a predetermined angular distance, and (2) data has been collected twice for the particular bin by twice rotating the sensor head in the acquisition direction through the rotational range associated with the particular bin.

7. The method of claim 1 wherein the step of acquiring positional information as the beam of collimated light impinges on the detection surface of the detector further comprises determining whether the collimated beam of light impinges a first detection region or a second detection region on the detecting surface of the detector and storing region information.

8. The method of claim 1 wherein the step of acquiring positional information as the beam of collimated light impinges on the detection surface of the detector further comprises determining whether the collimated beam of light impinges a first detection region or a second detection region on the detecting surface of the detector and accepting positional information in the memory of the microprocessor if it is determined that the collimated beam of light impinges upon the first detection region on the detector surface of the detector.

9. The method of claim 1 wherein the step of acquiring positional information corresponding to the positions of the centerlines of the first and second shafts as the collimated beam impinges on the detecting surface of the detector comprises acquiring the data at user defined resolution ranges defined as data bins.

10. The method of claim 1 wherein the step of detecting an impinging collimated light beam from the second direction on the detecting surface of the detector further comprises the step of providing the impinging collimated light beam from the second direction by reflecting an incident beam transmitted in the first direction from a collimated light source emitter.

11. A method for acquiring data as to centerlines of first and second in-line shafts comprising the steps of:

(a) mounting a first sensor head including a collimated light source emitter for transmitting a collimated light beam in a first direction corresponding to the centerline of the first shaft, a detector having a detecting surface for detecting a collimated light source from a second direction corresponding to a position of the centerline of the second shaft, and an angular position sensor for determining an angular position of the sensor head as the head is rotated about the centerline of the first shaft, (b) mounting a second sensor head including a collimated light source emitter for transmitting a collimated light beam in the second direction corresponding to the centerline of the second shaft, a detector having a detecting surface for detecting a collimated light source from the first direction corresponding to a position of the centerline of the first shaft, and an angular position sensor for determining an angular position of the sensor head as the head is rotated about the centerline of the second shaft, (c) positioning the first sensor head relative to the centerline of the first shaft such that the collimated light source from the second direction impinges upon the detecting surface of the first sensor head detector, (d) positioning the second sensor head relative to the centerline of the first shaft such that the collimated light source from the first direction impinges upon the detecting surface of the second sensor head detector, (e) rotating the sensor heads in a first or a second rotational direction relative to the centerlines of the first and second shafts, (f) detecting an impinging collimated light beam from the second direction on the detecting surface of the detector of the first sensor head, (g) detecting an impinging collimated light beam from the first direction on the detecting surface of the detector of the second sensor head, (h) based on the detecting steps, acquiring positional information corresponding to the positions of the centerlines of the first and second shafts as the collimated beams impinge on the detecting surfaces of the detectors of the first and second sensor heads and as the sensor heads are rotated, (i) determining angular positions of the first sensor head relative to the centerline of the first shaft, (j) determining angular positions of the second sensor head relative to the centerline of the second shaft, (k) defining either the first or the second rotational direction as the acquisition direction, and (l) committing positional information to the memory of the sensor heads only if the positional information was acquired when the heads were rotating in the acquisition direction.

12. The method of claim 11 wherein the step of committing positional information further comprises:

defining predetermined rotational ranges of the heads as bins, and committing new positional information in association with a particular bin for which data has been collected twice by twice rotating the sensor heads in the acquisition direction through the rotational range associated with the particular bin.

13. The method of claim 11 wherein the step of defining either the first or the second rotational direction as the acquisition direction further comprises the steps of:

comparing the angular position of the sensor heads to a predetermined angular value corresponding to a rotational amount in the first or second direction relative to an initial angular position of the sensor heads, determining whether the angular position of the sensor heads has exceeded a predetermined angular value, and defining the acquisition direction when the predetermined angular value is exceeded in the first or second rotational direction.

14. The method of claim 11 wherein the step of acquiring positional information as the beams of collimated light impinge on the detection surfaces of the detectors of the first and second heads further comprises determining whether the collimated beams of light impinge a first detection region or a second detection region on the detecting surfaces of the detectors of the first and second heads and storing region information.

15. A method for acquiring data as to centerlines of first and second in-line shafts comprising the steps of:

(a) mounting a first sensor head including a collimated light source emitter for transmitting a collimated light beam in a first direction corresponding to the centerline of the first shaft, a detector having a detecting surface including a first detection region and a second detection region for detecting a collimated light source from a second direction corresponding to a position of the centerline of the second shaft, and an angular position sensor for determining an angular position of the sensor head as the head is rotated about the centerline of the first shaft, (b) mounting a second sensor head including a collimated light source emitter for transmitting a collimated light beam in the second direction corresponding to the centerline of the second shaft, a detector having a detecting surface including a first detection region and a second detection region for detecting a collimated light source from the first direction corresponding to a position of the centerline of the first shaft, and an angular position sensor for determining an angular position of the sensor head as the head is rotated about the centerline of the second shaft, (c) positioning the first sensor head relative to the centerline of the first shaft such that the collimated light source from the second direction impinges upon the detecting surface of the first sensor head detector, (d) positioning the second sensor head relative to the centerline of the first shaft such that the collimated light source from the first direction impinges upon the detecting surface of the second sensor head detector, (e) rotating either the first or the second sensor head in a first or a second rotational direction relative to the centerline of either the first or the second shaft, (f) detecting an impinging collimated light beam from the second direction on the detecting surface of the detector of the first sensor head, (g) detecting an impinging collimated light beam from the first direction on the detecting surface of the detector of the second sensor head, (h) based on the detecting steps, acquiring positional information corresponding to the positions of the centerlines of the first and second shafts as either the first or the second collimated beam impinges on the detecting surfaces of the detectors of the first or second heads, (i) determining angular positions of the first sensor head relative to the centerline of the first shaft, (j) determining angular positions of the second sensor head relative to the centerline of the second shaft, (k) acquiring positional information as the first collimated beam of light impinges on the detecting surface of the detector of the second sensor head, (l) acquiring positional information as the second collimated beam of light impinges on the detecting surface of the detector of the first sensor head, (m) committing positional information to the memory of the first sensor head only if the positional information was acquired when the second collimated light beam impinged on the first detection region of the detecting surface of the detector of the first sensor head, and (n) committing positional information to the memory of the second sensor head only if the positional information was acquired when the first collimated light beam impinged on the first detection region of the detecting surface of the detector of the second sensor head.

16. The method of claim 15 wherein the steps of acquiring positional information further comprises the steps of:

comparing the angular position of the first sensor head to a predetermined angular value corresponding to a rotational amount in the first or second direction relative to an initial first sensor head angular position, comparing the angular position of the second sensor head to a predetermined angular value corresponding to a rotational amount in the first or second direction relative to an initial second sensor head angular position, determining whether the angular position of the first sensor head has exceeded the predetermined angular value, determining whether the angular position of the second sensor head has exceeded the predetermined angular value, defining an acquisition direction for the first sensor head when the predetermined angular value is exceeded in the first or second rotational direction, and defining an acquisition direction for the first sensor head when the predetermined angular value is exceeded in the first or second rotational direction.

17. The method of claim 15 wherein the steps of committing positional information further comprises the steps of:

defining predetermined rotational ranges of the first sensor head as bins, defining predetermined rotational ranges of the second sensor head as bins, averaging the committed positional information for each bin to determine an averaged positional information for each bin of the first sensor head, averaging the committed positional information for each bin to determine an averaged positional information for each bin of the second sensor head, committing the averaged positional information in the memory of the microprocessor in association with a corresponding bin of the first sensor head, and committing the averaged positional information in the memory of the microprocessor in association with a corresponding bin of the second sensor head.

18. The method of claim 15 further comprising the step of:

synchronizing a microprocessor function of the first sensor head with a signal from the second sensor head.

19. The method of claim 18 wherein the step of synchronizing further comprises performing the synchronization via radio frequency, infrared frequency or a direct cable link.

20. The method of claim 18 wherein the step of synchronizing further comprises performing the synchronization utilizing the collimated light beam emitted from the second sensor head.

* * * * *